Nov. 29, 1955 E. W. BAGNELL Re. 24,098

INTERNAL ANCHOR DEVICE FOR WELLS

Original Filed March 9, 1950

EDGAR W. BAGNELL,
INVENTOR.

BY James W. Abbett

ATTORNEY

United States Patent Office

Re. 24,098

Reissued Nov. 29, 1955

24,098

INTERNAL ANCHOR DEVICE FOR WELLS

Edgar W. Bagnell, Glendale, Calif., assignor, by mesne assignments, to Johnston Testers, Inc., Houston, Tex., a corporation of Delaware Original No. 2,662,601, dated December 15, 1953, Serial No. 148,725, March 9, 1950. Application for reissue April 12, 1954, Serial No. 422,711

7 Claims. (Cl. 166—214)

Matter enclosed in heavy brackets [ ] appears in the original patent but forms no part of this reissue specification; matter printed in italics indicates the additions made by reissue.

This invention relates to an internal anchor device for wells.

In oil well production operations it is common practice to make side wall tests. These tests insure that the testing device shall be held in the well bore against longitudinal movement and rotation, and it is the principal object of the present invention to provide a device which is manipulated from the top of the well and which may anchor a side wall testing tool within the well bore. The present invention contemplates the provision of a body structure and anchor means which may be moved into engagement with a well bore to penetrate the same and to hold the entire structure against further operation during the time it is temporarily anchored.

The invention is illustrated by way of example in the accompanying drawing in which.

Figure 1:
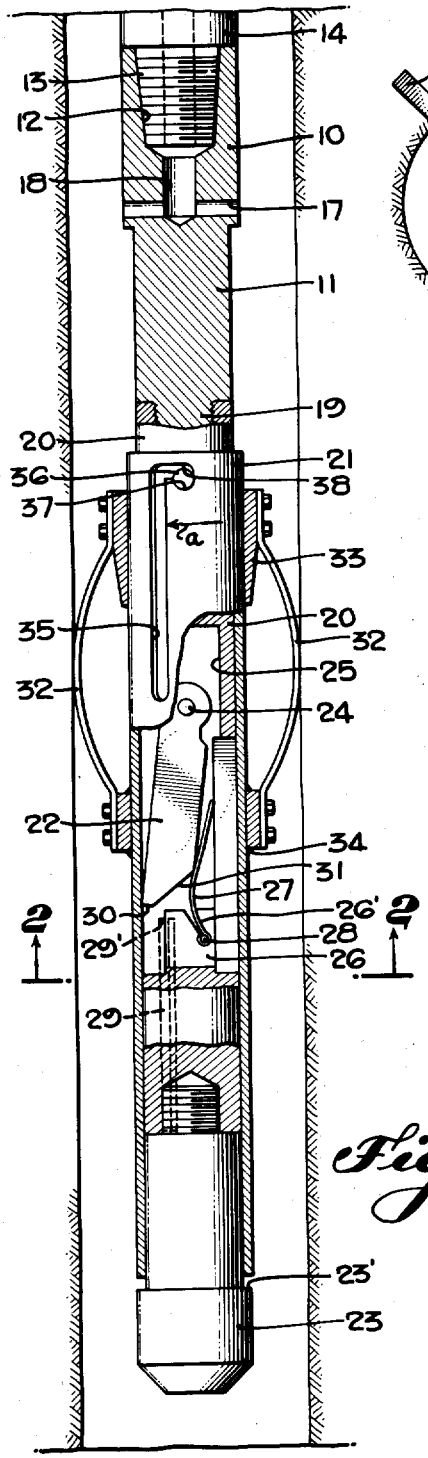
Figure 1 is a view in central longitudinal section showing the structure.

Referring more particularly to the drawing, 10 indicates a box formed at the upper end of a body member 11. This box is formed with a threaded section 12 which receives the threaded pin 13 of a supporting structure 14. This supporting structure may be a pipe, or it may be a section of a formation testing tool to which the entire assembly of an anchor may be secured. It is to be understood that above the anchor stucture may be provided packers 15 of a side wall tester. In the present invention it is desirable to anchor the lower structure so that the packers may be set. In some instances the packers are disposed with openings 16 between the packers so that fluid may flow into the string 14 from beneath the packer. By-pass ports 17 are formed in the body 11 and communicating with a central upwardly extending opening 18. At the lower end of the body 11 is a threaded pin 19 which extends into the threaded bore of an inner sleeve 20. The inner sleeve 20 is longitudinally mounted within an outer sleeve 21.

The device is designed so that it will be anchored at a desired level within the well bore, or so that it will rest on the bottom of the well bore. When it is desired to be anchored at a point along the well bore, dogs 22 are used, and when it is desired to be set at the bottom of the well bore, a nose 23 is provided which rests directly upon the lower end of the bore in the same manner as an anchor pipe. The dogs 22 are mounted on pivot pin 24 which is carried by the inner sleeve 20. This sleeve is cut out, as indicated at 25, to accommodate the dogs and to permit them to swing from vertical toward horizontal positions.

The sleeve 20 has a downward extending portion 26 for the support of leaf springs 27. These springs are pivotally mounted at their lower ends upon the support by pins 28.

Figure 2:
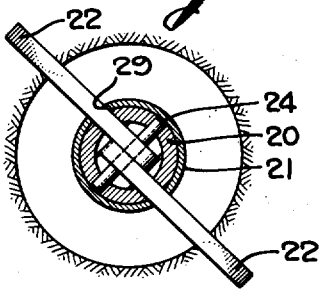
Fig. 2 is a view in transverse section through the device as viewed in the direction indicated by the arrows 2—2 of Fig. 1 with the anchoring means spread to their operating position.
Figure 4:
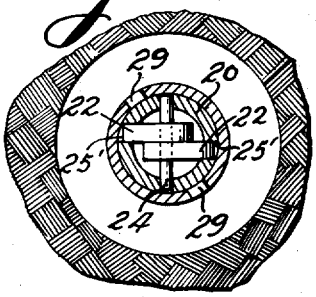
Fig. 4 is a transverse sectional view similar to Fig. 2, showing the anchoring arms in their withdrawn or enclosed position.
Figure 3:
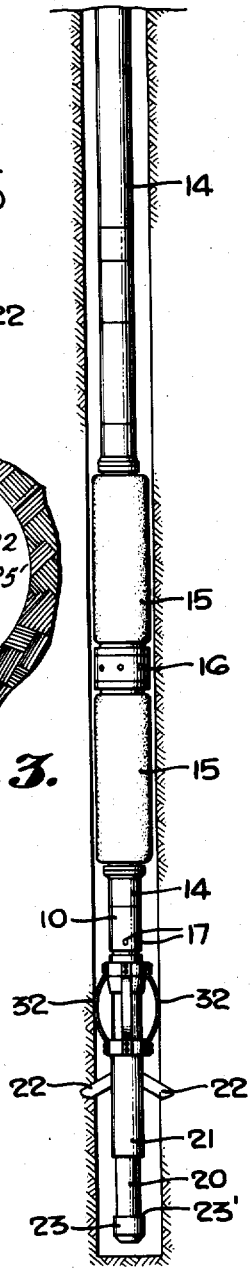
Fig. 3 is a longitudinal view in elevation showing the application of the present invention to a side wall tester.

The dogs 22 are movable to outwardly extending positions, as shown in Fig. 2, through slot portions 25 formed as part of the cut away portion 25 of the sleeve 20 and slots 29 formed in the outer sleeve 21, the slot portions 25' being movable to register with the slots 29 as hereinafter explained.

The lower ends of the leaf springs may rest against a recessed shoulder 26' on the extension 26 which tends to prevent the springs 27 from swinging rearwardly while they are under tension tending to urge the dogs 22 outwardly and to bear against the outer sleeve 21. The dogs are formed with a blunt end 30 which may be forced outwardly into the formation, and an inclined face 31 which may move along the leaf springs 27 if desired. In order to cause the dogs to move outwardly with relation to the springs it is necessary to provide bow springs 32 which extend longitudinally of the outer sleeve 21. The upper ends of the bow springs 32 are fixed to collars 33 which slide longitudinally of the outer sleeve 21 and the lower ends of the springs 32 are fixed to collars 34. The collars 34 are preferably welded in position so that they will not move relative to the outer sleeve 21.

In order to hold the anchor mechanism in its retracted positions the outer sleeve 21 is formed with a longitudinal slot 35 which is to receive a pin 36. The pin 36 stands radially from the side of the inner sleeve 20 and may seat normally in a recess 37. The upper end of the slot 35 is made with a transverse passageway 38 which may receive the pin 36 and allow it to travel from the slot 35 to the recess 37.

In operation of the present structure the side hole tester is attached to the pin 13. It is preferably exposed below the lowermost packer 15. In the event it is desired to operate on the bottom of the hole the nose 23 is rested on the bottom of the hole, and in the event it is desired to set the side hole anchor at any desired depth in the open hole the entire tool may be lowered until the bow springs 32 are at a desired level. If the bow springs are used the tool is lowered to a desired level for the bow springs, after which the body member 11 is lifted to raise the pin 36 from the recess 37. The body and the inner sleeve are rotated in the direction of the arrow *a*, as shown in Fig. 1 of the drawing, until the pin 36 is in register with the longitudinal portion 35 of the bayonet slot. When the pin has been rotated into alignment with the longitudinal slot 35 the free ends of the dogs 22 will be in longitudinal alignment with the slots 29 in the outer sleeve 21 and thereabove.

The inner sleeve 20 and the pin 36 are then lowered downwardly. In the meantime the bow springs will hold the outer sleeve 21 against rotation and longitudinal movement. The inner sleeve 20 is then moved downwardly so that the pins 24 will force the dogs 22 downwardly and springs 27 will cause the dogs to be forced outwardly through the slotted openings 29 in the sleeve 21 to assume the position shown in Fig. 2 of the drawing. When in this position the blunt ends 30 of the dogs 22 will be forced into the side walls of the open hole and will prevent further longitudinal movement of the sleeve 21. This will make it possible for the weight applied by the supporting string 14 to rest upon the packer 15 and compress and expand the packer as desired. Fluid from the formation may then flow in through the transverse ports 17 to the central opening 18 and may then pass upwardly through the supporting string 14 so that in the event a formation tester is disposed at any distance along the length of the supporting string 14 the fluid will be entrapped and a sample will be taken. It will also be recognized that if for any purpose it is desired to hold the sleeve 21 against rotation the dogs 22 will penetrate the formation of the side walls, as shown in Fig. 2, so that rotation cannot be produced. It is understood that the bow springs 32 project outwardly into the well bore sufficiently so that the springs will flex and engage the walls frictionally. This will cause the springs 32 to be compressed inwardly and will force the collar 33 upwardly along the outer sleeve 21 while the lower ends of the springs are being held by the fixed collars 34. If it should be desired to set the side wall tester near the bottom of the hole the nose 23 may be caused to rest directly upon the end of the hole. The weight of the string may then rest upon the packers 15 of the side wall tester to enable them to be compressed and expanded as desired.

It is to be understood that while the structure has been described as being used only with a lower packer 15 which will draw fluid from the formation through the ports 17, that if desired two packers 15 may be used and spaced from each other so that fluid will pass between the packers and through the passageway 16.

Attention is called to the fact that the slots 29 through the outer sleeve 21 and designed to accommodate the dogs 22 are formed with limiting shoulders 29' which will limit the upward swing of the dogs and allow the weight of the drill string to be imposed upon the dogs.

*If it is desired to position the structure at a different location in the well, the dogs 22 may be released from the earthen side walls of the well by raising the tubing 14. Outer sleeve 21 is held stationary by bow springs 32 and dogs 22 are pressed inwardly by the upper ends of slots 29 as inner sleeve 20 is raised by tubing 14. The tubing may or may not be rotated to latch the sleeve in position to permit movement to a new location.*

It will thus be seen that the structure here disclosed provides simple means whereby a portion of packer structure below a packer sleeve may be easily anchored so that the weight of a drill string may be imposed upon the packer to expand and compress the same, said structure being also designed to permit the anchor to be easily released when desired.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. An anchor for packers and the like, comprising a body structure, a pair of swingably mounted dogs on the body structure spring-urged in opposite directions toward the walls of a well bore, and means frictionally engageable with the walls of a well bore including a sleeve rotatably carried by the body structure and surrounding the dogs to releasably restrain them against outward movement and having an inverted J slot formed therein receiving in the short vertical portion thereof a pin on the body structure, said sleeve having openings formed therein disposed downwardly and circumferentially of the dogs when the pin is in the short vertical portion of the J slot, adapted to be brought into registry with the dogs when the pin is moved over and down into the long vertical portion of the slot to release the dogs.

2. An anchor for packers and the like, comprising a body structure, a pair of dogs on the body structure swingably mounted for movement in opposite directions toward the walls of a well bore, and means frictionally engageable with the walls of the well bore including a sleeve rotatably carried by the body structure and surrounding the dogs to releasably retain them against outward movement and having an inverted J slot formed therein receiving in the short vertical portion thereof a pin on the body structure, said sleeve having openings formed therein disposed downwardly and circumferentially of the dogs when the pin is in the short vertical portion of the J slot and adapted to be brought into registry with the dogs when the pin is moved over and down into the long vertical portion of the J slot to release the dogs.

3. An anchor for packers and the like, comprising a body structure, a pair of dogs on the body structure mounted for movement in opposite directions toward the walls of a well bore, and means frictionally engageable with the walls of the well bore including a sleeve rotatably carried by the body structure and surrounding the dogs, releasably restraining them against outward movement and having an inverted J-shaped slot formed therein receiving in the short vertical portion thereof a pin on the body structure, said sleeve having openings formed therein disposed downwardly and circumferentially of the dogs when the pin is disposed in the short vertical portion of the J slot and adapted to be brought into registry with the dogs when the pin is moved over and down into the long vertical portion of the J slot to release the dogs for outward movement.

4. An internal anchor device for wells comprising a body structure, at least one swingably mounted dog on the body structure spring-urged outwardly toward the walls of the well bore, a sleeve rotatably carried by the body structure and surrounding the dog and being formed with a slot circumferentially spaced from the dog and adapted to be brought into registry with the dog to release the same for outward movement, and means on the sleeve frictionally engageable with the walls of the the well bore to retard rotary movement of said sleeve upon rotation of the body structure to cause the slot to be brought into registery with the dog to release said dog.

5. An internal anchor device for wells comprising a body structure, at least one dog mounted on the body for outward movement toward the walls of the well bore, a sleeve rotatably carried by the body structure and surrounding the dog and being formed with a slot circumferentially spaced from the dog and adapted to be brought into registry with the dog to release the same for outward movement, and means on the sleeve frictionally engageable with the walls of the well bore to retard rotary movement of said sleeve upon rotation of the body structure to cause the slot to be brought into registry with the dog to release the dog.

*6. An internal anchor device for wells comprising a body structure, at least one dog mounted on the body for outward movement toward the walls of the well bore, a sleeve movably embracing the body structure and normally overlying the dog to maintain the dog confined to its non-wall engaging position, said sleeve having an elongated slot formed therein adapted to be brought into register with said dog by longitudinal movement of said sleeve relative to said body in one direction to enable the dog to project to its wall engaging position, said sleeve being adapted when moved relative to said body in the opposite direction to retract said dog, means on the sleeve frictionally engageable with the walls of the well bore to retard movement of said sleeve upon movement of said body structure and thereby cause relative movement therebetween, and releasable latch means for preventing relative longitudinal movement between said sleeve and said body, said latch means being releasable from the surface to permit said relative longitudinal movement.*

*7. An internal anchor device for wells comprising a body structure, a plurality of dogs mounted on the body for outward movement toward the walls of the well bore, a sleeve movably embracing the body structure and normally overlying the dogs to maintain the dogs confined to their non-wall engaging position, said sleeve having elongated slots formed therein adapted to be brought into register with said dogs by longitudinal movement of said sleeve relative to said body in one direction to en-*

*able the dogs to preject to their wall engaging position, said sleeve being adapted when moved relative to said body in the opposite direction to retract said dogs, means on the sleeve frictionally engageable with the walls of the well bore to retard movement of said sleeve upon movement of said body structure and thereby cause relative movement therebetween, and releasable latch means for preventing relative longitudinal movement between said sleeve and said body, said latch means being releasable from the surface to permit said relative longitudinal movement.*

References Cited in the file of this patent or the original patent

UNITED STATES PATENTS

| | | |
|---|---|---|
| 1,034,963 | Boutte | Aug. 6, 1912 |
| 1,124,602 | Fuqua et al. | Jan. 12, 1915 |
| 2,231,767 | Mason, Jr. | Feb. 11, 1941 |
| 2,331,185 | Gordy | Oct. 5, 1943 |
| 2,428,139 | Bridwell et al. | Sept. 30, 1947 |
| 2,482,985 | Lockwood | Sept. 27, 1949 |
| 2,605,843 | Baker | Aug. 5, 1952 |